United States Patent
Williams

(10) Patent No.: US 9,539,965 B2
(45) Date of Patent: Jan. 10, 2017

(54) BUMPER MOMENT INDUCER

(71) Applicant: Toyota Motor Engineering & Manufacturing North America, Inc., Erlanger, KY (US)

(72) Inventor: Paxton S. Williams, Milan, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/690,337

(22) Filed: Apr. 17, 2015

(65) Prior Publication Data
US 2016/0304043 A1  Oct. 20, 2016

(51) Int. Cl.
B60R 19/02 (2006.01)
B60R 19/18 (2006.01)
B60R 19/24 (2006.01)
B60R 19/00 (2006.01)

(52) U.S. Cl.
CPC ............ *B60R 19/023* (2013.01); *B60R 19/24* (2013.01); *B60R 2019/005* (2013.01); *B60R 2019/1806* (2013.01)

(58) Field of Classification Search
CPC .. B60R 19/04; B60R 19/44; B60R 2021/0023; B60R 19/023; B60R 19/24; B60R 19/18; B60R 2019/1806; B60R 2019/1813
USPC ....................................... 293/102; 296/187.1
See application file for complete search history.

(56) References Cited

U.S. PATENT DOCUMENTS

| | | | |
|---|---|---|---|
| 4,671,550 A | 6/1987 | Molnar | |
| 4,961,603 A | 10/1990 | Carpenter | |
| 6,179,353 B1 | 1/2001 | Heatherington et al. | |
| 6,227,582 B1 | 5/2001 | Ichien | |
| 6,349,521 B1 | 2/2002 | McKeon et al. | |
| 6,695,368 B1 | 2/2004 | Weykamp et al. | |
| 7,017,960 B2 | 3/2006 | Reierson et al. | |
| 7,357,432 B2 | 4/2008 | Roll et al. | |
| 7,954,866 B2 * | 6/2011 | Barcomb | B60R 19/02 293/102 |
| 8,505,990 B2 | 8/2013 | Czopek et al. | |
| 8,807,632 B2 * | 8/2014 | Ramoutar | B60R 19/24 293/132 |
| 9,010,845 B1 * | 4/2015 | Ramoutar | B60R 19/14 293/155 |
| 9,248,795 B1 * | 2/2016 | Schnabelrauch | B60R 19/44 |
| 9,315,167 B1 * | 4/2016 | Hardy | B60R 19/04 |
| 2008/0309103 A1 * | 12/2008 | Frederick | B60R 19/18 293/120 |
| 2009/0302591 A1 * | 12/2009 | Auer | B60R 19/54 280/784 |
| 2010/0001540 A1 * | 1/2010 | Barcomb | B60R 19/02 293/155 |
| 2010/0133859 A1 | 6/2010 | Lutke-Bexten et al. | |
| 2014/0054907 A1 | 2/2014 | So et al. | |

(Continued)

*Primary Examiner* — Gregory Blankenship
(74) *Attorney, Agent, or Firm* — Dinsmore & Shohl LLP

(57) ABSTRACT

A bumper for a vehicle is provided where the bumper adapted to induce torque of the bumper during a collision, the bumper having a crush box. The bumper includes a bumper beam having an outer surface, a moment inducer extending away from the outer surface of the bumper beam, the moment inducer positioned adjacent to the distal end of the bumper beam. The moment inducer is rigid and adapted to transfer force (energy) rather than absorbing it.

19 Claims, 2 Drawing Sheets

(56) References Cited

U.S. PATENT DOCUMENTS

| | | | |
|---|---|---|---|
| 2014/0091585 A1* | 4/2014 | Ramoutar | B60R 19/24 293/133 |
| 2014/0091595 A1* | 4/2014 | Ramoutar | B60R 19/24 296/187.09 |
| 2016/0096496 A1* | 4/2016 | Hardy | B60R 19/04 296/187.1 |
| 2016/0101751 A1* | 4/2016 | Bou | B62D 21/152 293/133 |
| 2016/0152201 A1* | 6/2016 | Ramoutar | B60R 19/16 296/187.1 |

* cited by examiner

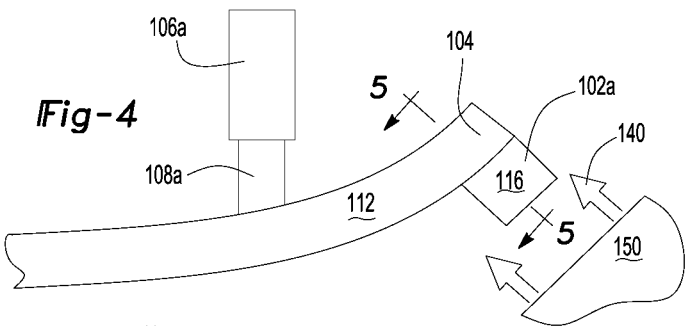
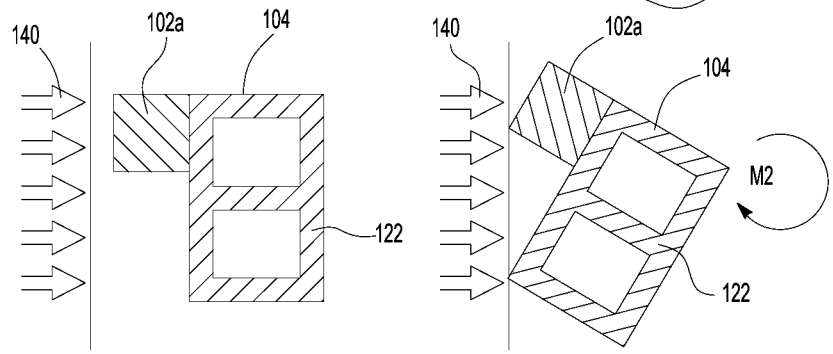
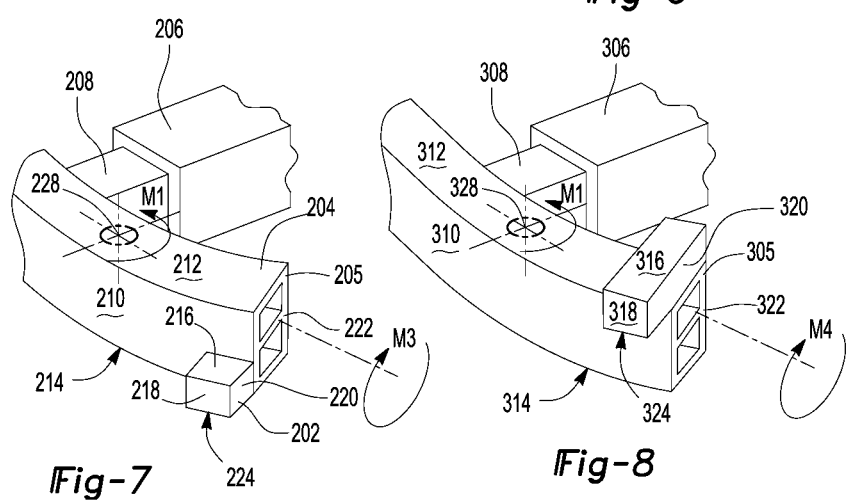

BUMPER MOMENT INDUCER

FIELD OF THE INVENTION

The present apparatus relates generally to vehicle bumpers. More particularly, the present apparatus relates to a bumper having a moment inducer adapted to induce torque during a crash situation.

BACKGROUND

Bumper beams are commonly provided behind a bumper fascia to provide structural support during a collision. The bumper beam is connected to a crush box adapted to crush and deform in a small overlap (SOL) crash condition. Furthermore, it is desirable for the bumper beam to bend in an angled rigid barrier (ARB) collision situation. In an ARB collision situation, it is desirable for the crush box not to deform but rather have the bumper beam bend. However, the current bumper beam does not easily provide for both collision conditions. Accordingly, there exists a need in the art to provide a bumper beam which can function properly to meet both deformation modes. More specifically, a bumper beam having no bending in the SOL deformation mode and bending before crush box for ARB deformation mode is strongly desired.

SUMMARY

A bumper beam having a moment inducer is provided allowing for multiple deformation modes in various collision conditions. A moment inducer is provided connected to a distal end of the bumper beam and is adapted to induce a torque force during a collision thus providing for deformation of the bumper beam and not the crush box. In one embodiment, the moment inducer is generally a protrusion extending away from a front surface of the bumper beam. In other embodiments, the moment inducer is provided connected to an upper surface of the bumper beam but still extending away from the front surface of the bumper beam. In an angled rigid barrier (ARB) deformation mode, a vehicle contacts the bumper beam at an angle. As the vehicle contacts the bumper beam and the moment inducer, the bumper beam is induced to twist thereby deforming the bumper and not the crush box.

A bumper for a vehicle is provided where the bumper adapted to induce torque of the bumper during a collision, the bumper having a crush box. The bumper includes a bumper beam having an outer surface, a moment inducer extending away from the outer surface of the bumper beam, the moment inducer positioned adjacent to the distal end of the bumper beam. The moment inducer is rigid and not energy absorbing. Conversely the moment inducer transfers force and is adapted to induce twisting of the bumper beam during a collision thereby causing the bumper beam to bend before crushing the crush box.

In one embodiment the outer surface includes a front surface, the moment induce extending generally orthogonally away from the front surface. In another embodiment the outer surface further includes an upper surface, the moment inducer connected to the upper surface, the moment inducer extending away from the upper surface and positioned generally perpendicular to a front surface of the outer surface of the bumper beam. In yet another embodiment the outer surface further includes a lower surface, the moment inducer connected to the lower surface, the moment induce extending away from the lower surface and positioned generally perpendicular to a front surface of the outer surface of the bumper beam.

In all embodiments the moment inducer has a height less than the height of the bumper beam. In configuration is important to facilitate the twisting of the bumper beam. The vehicle is able to essentially life the moment u=inducer upwards (or push it downwards) to facilitate twisting of the bumper beam. In one embodiment, the height of the moment inducer is less than half of the height of the bumper beam. In further embodiments, the height of the moment inducer is less than one third of the height of the bumper beam.

BRIEF DESCRIPTION OF THE DRAWINGS

FIG. 4 illustrates a top view of the bumper beam having a moment inducer in an ARB deformation mode;

FIG. 5 illustrates a cross-sectional view of a bumper beam having a moment inducer in an ARB deformation mode before deformation occurs;

FIG. 6 illustrates a cross-sectional view of the bumper beam in an ARB deformation mode after deformation has occurred;

FIG. 7 illustrates an alternative embodiment of the moment inducer positioned at a lower portion of the front surface of the bumper beam; and FIG. 8 illustrates an alternative embodiment where the moment inducer is connected to the upper surface of the bumper beam and still extends away from the front surface of the bumper beam.

DETAILED DESCRIPTION

A bumper beam for a vehicle is provided having a protruding projection, or moment inducer, adapted to induce torque in the event of a collision. The moment inducer creates an additional moment to the bumper beam. The additional moment increases the stress of the beam and thus induces twisting of the beam and not deformation of the crush box. The bumper beam having the moment inducer deforms before deformation of the crush box. The moment inducer extends away from a front surface of the bumper beam and is adapted to contact the other vehicle during a collision to facilitate twisting of the bumper beam.

The moment inducer is advantageous in that a single bumper beam shape can have multiple deformation modes to match the intended performance required. The moment inducer is also advantageous in that it may be used as a minor change to existing vehicle programs whose frame structure is not changing. The moment inducer is also advantageous in that it allows for additional styling freedom in certain circumstances as the general shape of the bumper beam, and dimensions of the bumper beam, does not drastically change. The lack of change allows for the bumper fascia to remain the same.

During a collision of frontal impact or small overlap (SOL) conditions, the bumper beam will contact the area just in front of a frame portion of the vehicle structure. In this collision condition, the beam is intended not to bend but to put forces on the crush box to absorb energy during its deformation. With curvature in the bumper beam, the end portion will not come into contact with the barrier during this deformation mode. Conversely, during an angled barrier impact deformation mode, bending of the beam under lower input forces is preferred to prevent many high forces going into the frame causing bending. The beam should bend before the crush box deforms. Balancing between no bending and bending modes during these two impacts is difficult to achieve. Accordingly, a moment inducer is added to the bumper beam to induce a torque or moment which will help initiate a fracture in a different mode than in the frontal crash mode.

Figure 1:
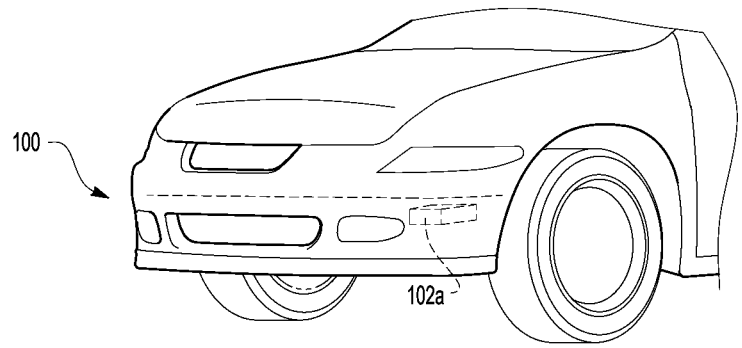
FIG. 1 illustrates an environmental view of a vehicle having a moment inducer.
Figure 2:
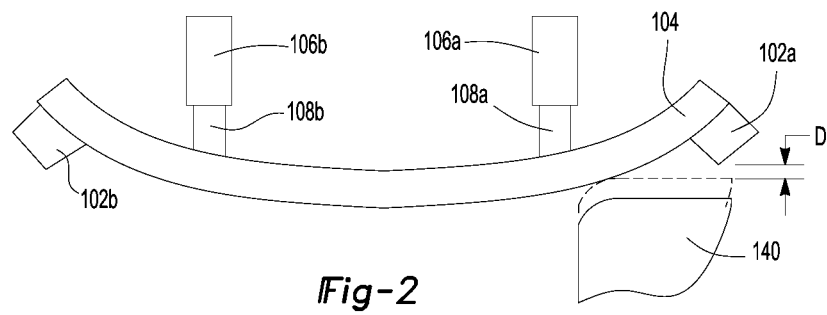
FIG. 2 illustrates a top view of a bumper beam having a plurality of moment inducers during an SOL deformation mode.

A vehicle 100 having a projection, or moment inducer, 102 is now disclosed. The terms moment inducer and projection may be used interchangeably. The moment inducer 102 is provided connected to the bumper beam 104. The bumper beam 104 connects to the vehicle 100 by means of the frame portions 106a, 106b and the crush boxes 108a, 108b. During an SOL deformation condition such as illustrated in FIG. 2, the crush boxes 108a, 108b will deform before bending of the bumper beam 104 occurs. In this SOL deformation mode, a vehicle 140 does not come into contact with the moment inducer 102a. In the deformation mode as illustrated in FIG. 2, it is desirable to have the crush box 108a deform before any bending of the bumper beam 104 occurs. The moment inducer 102a is dimensioned so as to not come into contact with the vehicle 140 thereby inducing deformation of the crush box 108a.

The moment inducer 102a is generally rectangular or square in structure. In other embodiments, the moment inducer 102a may be cylindrical, generally triangular, or any other basic geometric shape. Other embodiments may include a general protrusion including a rounded distal end or smooth edges. In the present embodiment, the moment inducer 102a includes an upper surface 116 and a lower surface 124. A front surface 118 is provided and is generally perpendicular to a front surface 110a of the bumper beam 104. A side surface 120 is provided and is flush with the distal end 105 of the bumper beam 104.

The moment inducer 102a is provided at a distal end 105 of the bumper beam 104. In the present embodiment, the moment inducer 102a is positioned directly adjacent to and flush with the far distal end 105 of the bumper beam 104. In other embodiments, the moment inducer 102a may be slightly spaced apart from the surface 122 of the distal end 105 of the bumper beam 104.

The bumper beam 104 includes a front surface 110, an upper surface 112, and a lower surface 114. In the present embodiment, the moment inducer 102a extends away from the front surface 110. Furthermore, in the present embodiment, the moment inducer 102a is positioned at an upper right-hand corner of the front surface 110 of the bumper beam 104.

Figure 3:
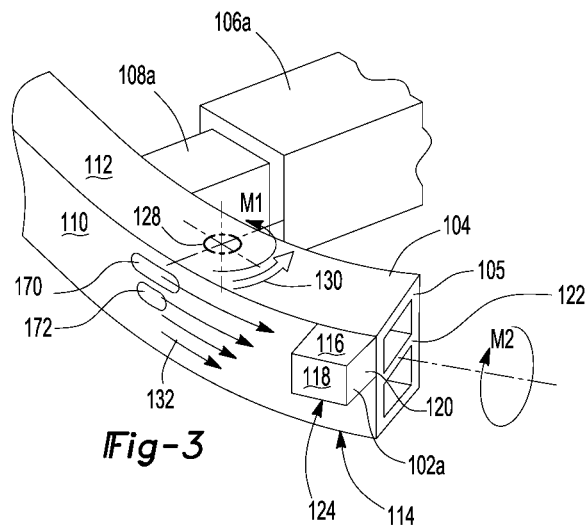
FIG. 3 illustrates a perspective view of the bumper beam having a moment inducer.

In some embodiments, a trigger point may be included on the outer surface of the bumper beam. One embodiment of the trigger point is illustrated in FIG. 3 at reference numerals 170, 172. In this embodiment, 2 trigger points 170, 172 are indented into the front surface 110 of the bumper beam 104. The trigger points are small indentations adapted to weaken the front surface and overall bumper beam 104 to induce bending of the bumper beam 104. In other embodiments, the trigger points may be holes, apertures, cuts, embossed shapes or raised surfaces adapted to weaken the structure of the bumper beam 104 to induce bending after moment is applied. It should be appreciated that the trigger points discussed above may be incorporated into any other embodiments, such as those illustrated in FIGS. 7 and 8.

By adding the moment inducer 102a to the bumper beam 104, the point load creates an additional moment $M_2$ to the bumper beam 104. The additional moment $M_2$ is in addition to the moment created at point 128 indicated by reference numeral $M_1$. By providing the forces as illustrated in FIG. 4 towards the front surface 110 of the bumper beam 104 and the front surface 118 of the moment inducer 102a, a first moment $M_1$ is provided to the bumper beam 104 and a second moment $M_2$ is provided adapted to twist the bumper beam 104 about an axis extending along the bumper beam 104, such as illustrated in FIG. 6. The addition of the second moment $M_2$ by means of the moment inducer 102a results in more force 132 provided towards the top of the bumper beam. Bending 130 and twisting such as illustrated in FIG. 6 thereby further induce deformation of the bumper beam 104 during an ARB deformation mode during a collision thereby reducing the likelihood that the crush box 108a will deform before the bumper beam 104 deforms.

Inclusion of the first moment $M_1$ and the second moment $M_2$ will increase the stress at point 128 and will concentrate the stress at a desired location to initiate a bend in the beam thereby causing it to bend before the crush box 108a.

In an alternative embodiment such as shown in FIG. 7, a moment inducer 202 is position at a lower portion of the distal end of the bumper beam.

The moment inducer 202 is provided connected to the bumper beam 204. The bumper beam 204 connects to the vehicle by means of the frame portions 206 and the crush box 208. During an SOL deformation condition, the crush box 208 will deform before bending of the bumper beam 204 occurs. In this SOL deformation mode, the vehicle does not come into contact with the moment inducer 202. In the SOL deformation mode, it is desirable to have the crush box 208 deform before any bending of the bumper beam 204 occurs. The moment inducer 202 is dimensioned so as to not come into contact with the vehicle thereby inducing deformation of the crush box 208.

The moment inducer 202 is generally rectangular or square in structure. In other embodiments, the moment inducer 202 may be cylindrical, generally triangular, or any other basic geometric shape. Other embodiments may include a general protrusion including a rounded distal end or smooth edges. In the present embodiment, the moment inducer 202 includes an upper surface 216 and a lower surface 224. A front surface 218 is provided and is generally perpendicular to a front surface 210 of the bumper beam 204. A side surface 220 is provided and is flush with the distal end 205 of the bumper beam 204.

The moment inducer 202 is provided at a distal end 205 of the bumper beam 204. In the present embodiment, the moment inducer 202 is positioned directly adjacent to and flush with the far distal end 205 of the bumper beam 204. In other embodiments, the moment inducer 202 may be slightly spaced apart from the surface 222 of the distal end 205 of the bumper beam 204.

The bumper beam 204 includes a front surface 210, an upper surface 212, and a lower surface 214. In the present embodiment, the moment inducer 202 extends away from the front surface 210. Furthermore, in the present embodiment, the moment inducer 202 is positioned at a lower right-hand corner of the front surface 210 of the bumper beam 204.

By adding the moment inducer 202 to the bumper beam 204, the point load creates an additional moment $M_3$ to the bumper beam 204. The additional moment $M_3$ is in addition to the moment created at point 228. By providing the forces towards the front surface of the bumper beam 204 and the front surface 218 of the moment inducer 202, a first moment $M_1$ is provided to the bumper beam 204 and a second moment $M_3$ is provided adapted to twist the bumper beam 204, such as illustrated in FIG. 7. The addition of the second moment $M_3$ by means of the moment inducer 202 results in more force provided towards the top of the bumper beam. Bending and twisting such as illustrated in thereby further induce deformation of the bumper beam 204 during an ARB deformation mode during a collision thereby reducing the likelihood that the crush box 208 will deform before the bumper beam 204 deforms.

In an alternative embodiment such as shown in FIG. 8, a moment inducer 302 is position at a lower portion of the distal end of the bumper beam.

The moment inducer 302 is provided connected to the bumper beam 304. The bumper beam 304 connects to the vehicle by means of the frame portions 306 and the crush box 308. During an SOL deformation condition, the crush box 308 will deform before bending of the bumper beam 304 occurs. In this SOL deformation mode, the vehicle does not come into contact with the moment inducer 302. In the SOL deformation mode, it is desirable to have the crush box 208 deform before any bending of the bumper beam 304 occurs. The moment inducer 302 is dimensioned so as to not come into contact with the vehicle thereby inducing deformation of the crush box 308.

The moment inducer 302 is generally rectangular or square in structure. In other embodiments, the moment inducer 302 may be cylindrical, generally triangular, or any other basic geometric shape. Other embodiments may include a general protrusion including a rounded distal end or smooth edges. In the present embodiment, the moment inducer 302 includes an upper surface 316 and a lower surface 324. A front surface 318 is provided and is generally perpendicular to a front surface 310 of the bumper beam 304. A side surface 320 is provided and is flush with the distal end 305 of the bumper beam 304.

The moment inducer 302 is provided at a distal end 305 of the bumper beam 304. In the present embodiment, the moment inducer 302 is positioned directly adjacent to and flush with the far distal end 305 of the bumper beam 304 and positioned on the upper surface 312 of the bumper beam 304. In other embodiments, the moment inducer 302 may be slightly spaced apart from the surface 322 of the distal end 305 of the bumper beam 304.

The bumper beam 304 includes a front surface 310, an upper surface 312, and a lower surface 314. In the present embodiment, the moment inducer 302 extends away from the front surface 310. Furthermore, in the present embodiment, the moment inducer 302 is positioned at a lower right-hand corner of the front surface 310 of the bumper beam 304.

By adding the moment inducer 302 to the bumper beam 304, the point load creates an additional moment $M_4$ to the bumper beam 304. The additional moment $M_4$ is in addition to the moment created at point 328. By providing the forces towards the front surface of the bumper beam 304 and the front surface 318 of the moment inducer 302, a first moment $M_1$ is provided to the bumper beam 304 and a second moment $M_4$ is provided adapted to twist the bumper beam 304. The addition of the second moment $M_4$ by means of the moment inducer 302 results in more force provided towards the top of the bumper beam. Bending and twisting such as illustrated in thereby further induce deformation of the bumper beam 304 during an ARB deformation mode during a collision thereby reducing the likelihood that the crush box 308 will deform before the bumper beam 304 deforms.

The moment inducers, such as 102, 202 and 302 discussed above, are rigid and not adapted to deform in a collision. The moment inducer is not an energy absorber, but rather facilitates a twisting action of the distal. Instead of absorbing energy, the moment inducer transfers energy.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

I claim:

1. A bumper assembly for a vehicle, the bumper assembly adapted to induce torque of the bumper assembly during a collision, the bumper assembly having a crush box, the bumper assembly comprising:
   a bumper beam having an outer surface; and
   a projection extending away from the outer surface of the bumper beam, the projection positioned adjacent to a distal end of the bumper beam;
   the projection being rigid and adapted to induce twisting of the bumper beam about an axis extending along the bumper beam during a collision thereby causing the bumper beam to bend before crushing the crush box.

2. The bumper assembly of claim 1, wherein the outer surface includes a front surface, the projection extends generally orthogonally away from the front surface.

3. The bumper assembly of claim 1, wherein the outer surface further includes an upper surface, the projection is connected to the upper surface, the projection extends away from the upper surface and is positioned generally perpendicular to the front surface of the outer surface of the bumper beam.

4. The bumper assembly of claim 1, wherein the outer surface further includes a lower surface, the projection is connected to the lower surface, the projection extends away from the lower surface and is positioned generally perpendicular to a front surface of the outer surface of the bumper beam.

5. The bumper assembly of claim 1, wherein the projection has a height less than a height of the bumper beam.

6. The bumper assembly of claim 5, wherein the height of the projection is less than half of the height of the bumper beam.

7. The bumper assembly of claim 5, wherein the height of the projection is less than one third of the height of the bumper beam.

8. The bumper assembly of claim 1, wherein the projection is generally rectangular.

9. The bumper assembly of claim 1, wherein a portion of the projection extends flush with the distal end of the bumper beam.

10. The bumper assembly of claim 1, wherein the bumper beam includes a front surface and an opposite rear surface, in a vehicle front-rear direction, the distal end extends between the front surface and the rear surface, and the projection extends away from the front surface of the bumper beam.

11. A bumper assembly for a vehicle, the bumper assembly adapted to induce torque of the bumper assembly during a collision, the bumper assembly having a crush box, the bumper comprising:
   a bumper beam connected to the crush box, the bumper beam having an outer surface and a distal end; and a projection extending away from the outer surface of the bumper beam, the projection positioned adjacent to the distal end of the bumper beam;

the projection being rigid and adapted to induce twisting of the bumper beam during a collision thereby causing the bumper beam to bend before crushing the crush box, the projection has a height less than a height of the bumper beam.

12. The bumper assembly of claim 11, wherein the height of the projection is less than half of the height of the bumper beam.

13. The bumper assembly of claim 11, wherein the height of the projection is less than one third of the height of the bumper beam.

14. The bumper assembly of claim 11, wherein at least one trigger point is provided to further induce bending.

15. A bumper assembly for a vehicle, the bumper assembly adapted to induce torque of the bumper assembly during a collision, the bumper assembly having a crush box, the bumper assembly comprising:
   a bumper beam having an outer surface and a distal end; and
   a projection extending away from the outer surface of the bumper beam, the projection positioned adjacent to the distal end of the bumper beam;
   wherein the outer surface includes an front surface, an upper surface and a lower surface, and the projection is connected to one of the upper surface and the lower surface, the projection extends away from the one of the upper surface and the lower surface and positioned generally perpendicular to the front surface of the outer surface.

16. The bumper assembly of claim 15, wherein the projection extends generally orthogonally away from the front surface.

17. The bumper assembly of claim 15, wherein the projection has a height less than a height of the bumper beam.

18. The bumper assembly of claim 17, wherein the height of the projection is less than half of the height of the bumper beam.

19. The bumper assembly of claim 17, wherein the height of the projection is less than one third of the height of the bumper beam.

* * * * *